United States Patent [19]

Abdoo et al.

[11] Patent Number: 4,984,213

[45] Date of Patent: Jan. 8, 1991

[54] MEMORY BLOCK ADDRESS DETERMINATION CIRCUIT

[75] Inventors: David G. Abdoo, Spring; Dale J. Mayer, Cypress, both of Tex.

[73] Assignee: Compaq Computer Corporation, Houston, Tex.

[21] Appl. No.: 313,237

[22] Filed: Feb. 21, 1989

[51] Int. Cl.$^5$ ............... G11C 7/00; G11C 8/00; G11C 11/407
[52] U.S. Cl. ............... 365/230.3; 365/230.06; 365/189.07; 365/189.08; 365/239
[58] Field of Search ............... 365/239, 230.03, 189.08, 365/189.07, 230.01, 230.06

[56] References Cited

U.S. PATENT DOCUMENTS

| | | | |
|---|---|---|---|
| 4,280,199 | 7/1981 | Osakabe et al. | 365/239 X |
| 4,303,993 | 12/1981 | Panepinto, Jr. et al. | 365/230.03 |
| 4,354,258 | 10/1982 | Sato | 365/189.08 X |
| 4,458,357 | 7/1984 | Weymouth et al. | 365/239 X |
| 4,811,297 | 3/1989 | Ogawa | 365/230.03 X |

OTHER PUBLICATIONS

IBM Corp., Personal System/2 Model 80 Technical Reference, First Edition, Apr. 1987, pp. 2-34 to 2-43.

*Primary Examiner*—Joseph A. Popek
*Assistant Examiner*—Alyssa H. Bowler
*Attorney, Agent, or Firm*—Hewitt, Kimball & Krieger Pravel, Gambrell

[57] ABSTRACT

An adder and a comparator form portions of a modular memory address block determination circuit. The starting address of the first block and the enable signal of the first block are added to produce the starting address of the second block. This procedure is repeated for each block. The determined starting address for each block is compared with the requested memory address and, unless the block is utilized or disabled, if equal a signal indicates the match. The circuit is used on a circuit board which emulates three conventionally separate memory circuit boards. The registers for each emulated board are provided and appropriate bus signals are developed.

8 Claims, 5 Drawing Sheets

MEMORY BLOCK ADDRESS DETERMINATION CIRCUIT

BACKGROUND OF THE INVENTION

1. Field of the Invention

The present invention relates to memory systems used in personal computer systems, and more particularly, to memory systems incorporating multiple previously independent systems and which include the capability for enabling and disabling portions of the memory system.

2. Description of the Prior Art

Personal computer systems are becoming more prevalent. Early personal computers used an 8 bit microprocessor and could address 64 kbytes of memory. While by current standards this seems wholly inadequate, at the time it was a major advance and allowed many previously difficult operations to be performed.

The electronic component manufacturers continued to make advances and personal computer users developed more powerful applications which began to push the limits of the available designs. Intel Corporation introduced the 8088 and 8086 microprocessors, which were 16 bit machines and could address 1 Mbyte of memory. Thus, significantly more computing power became available for use on personal computers. A number of early personal computers were designed using the 8088 and 8086 microprocessors and then International Business Machines Corporation (IBM) introduced the IBM PC, which utilized the 8088 microprocessor. This started the move forward to the current state of personal computers. Applications were developed for the IBM PC which were much more capable than the applications for the 8 bit personal computers. Thus the demand for the IBM PC grew and as the demand grew, more and more powerful applications were developed which soon pushed the PC, and the related PC/XT, to its limits.

Intel Corp. introduced the 80286 microprocessor which could address 16 Mbytes of memory and had significantly greater capabilities than the 8088 or 8086 microprocessors. IBM proceeded to develop and introduce the IBM AT which used the 80286 microprocessor. However, through the AT was more capable than the PC, the addressable random access memory space was still limited to 640 kbytes because of limitations in the operating system. A technique called expanded memory was developed which allowed access to physical memory beyond the 640 kbyte logical limit.

During this evolution of personal computers the sizes of available memory circuits increased. In the early 8 bit personal computers 16 kbit dynamic random access memories (DRAM's) were utilized An array of 32 or 36 circuits covered the entire memory space of the microprocessor and could easily fit on one circuit board. Sixty-four kbit DRAM's became available at approximately the same time as the 8086, thus allowing the increased memory space to be utilized. However, 90 circuits were required to fill the 640 kbytes of memory available under the operating system. These 90 circuits could not be placed on one small circuit board and so a plurality of boards having fewer DRAM's were utilized. The starting logical address of each board was set by switches or jumpers. This was not unreasonable at the time because the system integrators were generally very skilled and the number of options or possibilities was limited. The advent of the AT, expanded memory, and the 256 kbit DRAM changed this situation. Now 16 Mbytes of memory were available, with 567 256 kbit DRAMS's needed to completely fill the available address space for RAM. The physical space available on a given circuit board limited the amount of the memory a single circuit board could provide, so the addressing setup became much more complicated, particularly as more circuit boards were installed in the computer system. The expanded memory technique further dramatically complicated the situation by adding yet another layer of possibilities. A final layer of complexity was added by the need to disable portions of the circuit board if some memory circuits failed or were not placed in the circuit board. But setup and location of the memory was still done by switches and jumpers and the average skill level of the integrator had reduced as more users began assembling the computer system themselves. Thus many problems occurred trying to get memory boards properly installed. The use of 1 Mbit DRAM's partially simplified problems because fewer boards were needed for a given amount of memory, but the boards still had to allow for all possibilities, so the simplification was relatively minor.

As a perceived response to the demand for more capabilities in personal computers, IBM introduced the Personal System/2 family of personal computers. These systems used a different architecture, referred to as the MicroChannel Architecture or MCA, as compared to the architecture of the AT, referred to as the Industry Standard Architecture or ISA. For more information on the MCA, please refer to the IBM Corp. publication entitled "Personal System/2 Model 80 Technical Reference", having a publication date of April 1987.

One change made by IBM in moving from the ISA to the MCA was the specification of Programmable Option Select or POS registers. These registers allowed setup of circuit boards to be performed without the need for setting switches or jumpers. Various values written to these registers would be interpreted by the circuit board and the appropriate options set. For memory circuit boards the POS technique allowed the reading of the amount of memory installed on each circuit board. The total amount and configuration of the memory could thus be determined. After this determination was made, appropriate values were written to the POS registers to set the starting address of a memory board and which 1 Mbyte banks were enabled on the memory board.

When such a computer system was developed by IBM a standard 32 bit memory board was used. This memory board had a limit of 6 Mbytes of memory. To this end only six enable signals were defined in the POS registers, one for each 1 Mbyte bank of memory. If such boards were used in a computer system, several boards were necessary to reach the 16 Mbyte memory limit of an 80286 microprocessor. Three individual card slots were allocated to reach this 16 Mbyte limit, with an amount of memory, for example 1 or 2 Mbytes, being located on the system board. This need for potentially three slots dedicated to memory either required the use of a larger number of total slots if an acceptable number of non-memory slots were to be provided, thus increasing the overall size of the computer system, or the reduction in the number of non-memory slots or locations to below acceptable limits.

One overriding concern should the amount of memory on a given board be changed is compatibility with previous designs, particularly the IBM memory board design. Merely changing the amount of memory available on the board could have an adverse affect on compatibility, thus decreasing the usefulness of the revised board, unless all the desired applications programs and operating programs understood the different design. For example, if the memory size was doubled, the POS configuration and setup programs would not function properly. Because of limited numbers and codings of the values read to determine memory size, the POS configuration programs could not interpret values greater than 6 Mbytes. This presented a major problem because this would require a circuit board manufacturer to rewrite operating or machine specific programs. Additionally, the limit imposed by the number of lines available to enable or disable memory blocks would force a change in block size to greater than 1 Mbyte. This also creates problems with the POS setup programs. Thus, merely adding memory to a given board was not a viable solution.

The capability of enabling and disabling 1 Mbyte memory blocks required a way to determine which blocks were disabled and compare the resulting effective address of each block with the presented memory address to determine which memory circuits to use. When IBM developed its 32 bit memory board, the primary means of determining which set of memory circuits to utilize when a memory access was requested was through the use of programmable array logic devices (PAL's). The PAL's were encoded with all the terms representing the possible active states for the row address signals needed for use with DRAM's. This use of PAL's restricts any expansion of the design if the preferred 1 Mbyte enable block size is to be retained because of the number of terms present in PAL's available. Continuing the full possibility logic for more than six blocks as done by IBM results in using a very large number of PAL's and space at great cost, thus complicating the design of the memory circuit selection logic and increasing the cost.

SUMMARY OF THE INVENTION

The present invention is a memory system which emulates three IBM memory boards and includes improved logic for determining when a bank of memory circuits is enabled and requested. The POS registers for each memory board being emulated are provided. The memory system senses the appropriate card setup indication lines used for indicating access to the POS registers related to each circuit board being emulated. This allows the consolidation of up to three memory cards to one, reducing the needed size of the computer system.

The logic used to determine when a bank of memory circuits is enabled does not use any PAL's and is easily expandable to any number of 1 Mbyte blocks by the addition of one similar unit per block. Four bits of the starting address are provided to a first 4 bit adder, along with the enable signal for the first 1 Mbyte memory block to determine the staring address of the second 1 Mbyte memory block. The output of this adder, along with the enable signal for the second 1 Mbyte memory block is fed to a second 4 bit adder to determine the starting address of the third 1 Mbyte memory block. The output of this second adder and the enable signal for the third 1 Mbyte memory block are provided to a third adder to determine the starting address of the fourth 1 Mbyte memory block. The outputs of the adders and the initial starting address, along with the appropriate bits of the address lines are provided to a series of comparators to determine if a particular 1 Mbyte memory block is being accessed. Should a carry by an adder indicate a starting address above 16 Mbytes, that particular block and all above it are disabled, the preferred embodiment designed for operation only in the lowest 16 Mbytes of the memory space. Operation of a particular block is also inhibited if that particular block is not present or if that particular block is not enabled. If the particular block is not disabled and is being accessed, a select signal is produced to allow proper row and column addressing of the memory circuits. This above logic is repeated for each of the three emulated cards so that full compatibility remains.

BRIEF DESCRIPTION OF FIGURES

A better understanding of the invention can be had when the following detailed description of the preferred embodiment is considered in conjunction with the following drawings, in which.

DETAILED DESCRIPTION OF THE PREFERRED EMBODIMENT

Figure 1:
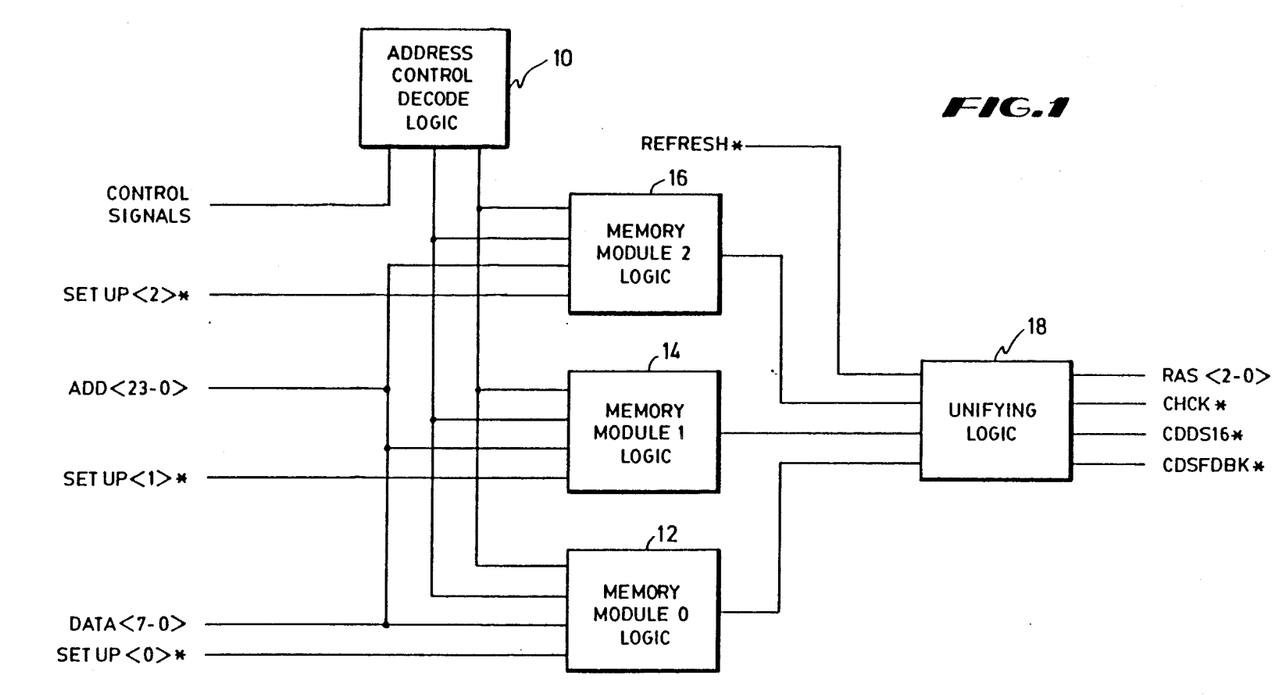
FIG. 1 is a block diagram of portions of a circuit board incorporating the present invention.

Referring now to FIG. 1, various blocks of circuitry utilized in a circuit board incorporating the present invention are shown. Address and control decode logic 10 is used to receive the control signals as necessary which are present on the MCA bus, to receive the 24 bits of the address line present on the 16 bit portion of the MCA bus and to output various control signals to the memory logic modules 12, 14 and 16. The address and control decode logic 10 interprets the address information and the control signal information to determine when addresses are properly presented and provides certain decoding information to the memory modules 12, 14 and 16.

Each memory module 12, 14 and 16 receives the 24 address lines, the lowest 8 data lines, and the SETUP* signal appropriate to the slot being emulated by the memory module 12, 14 or 16. Only the lower 24 address lines are utilized in the preferred embodiment, because it is designed to incorporate only a 16 bit data bus, thus according to the MCA specification only requiring the use of 24 address bits. Only eight data lines are shown connected to the memory modules 12, 14 and 16 in FIG. 1 because connections are not shown for the actual memory array but are shown provided only for the control logic. The actual memory array in the preferred embodiment is 16 bits wide and therefore utilizes all 16 bits of the data portions of the MCA bus.

Figure 2A:
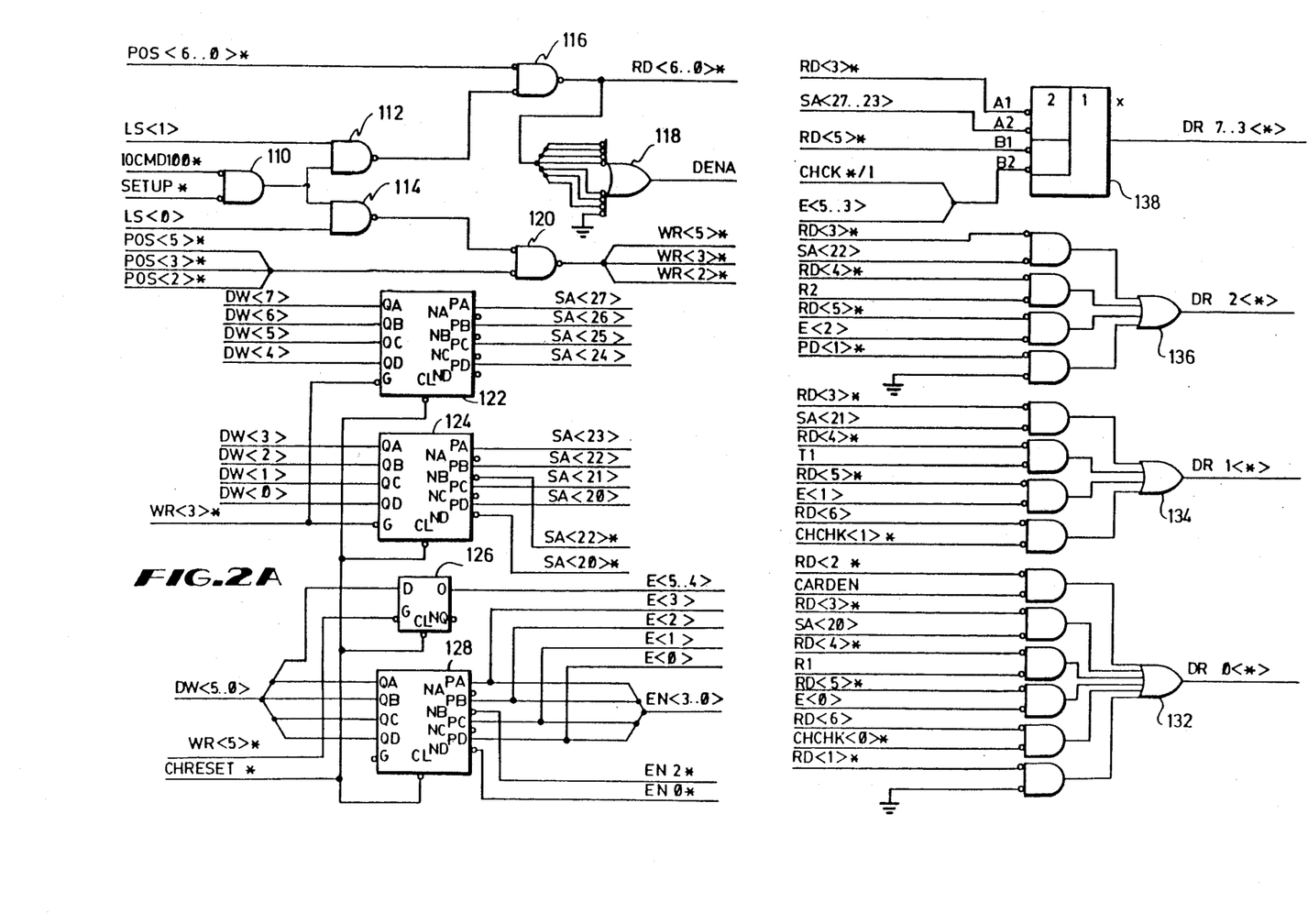
FIGS. 2, 3 and 4 are schematic logic diagrams of more detailed portions of the circuitry utilized in a circuit board incorporating the present invention.
Figure 2B:
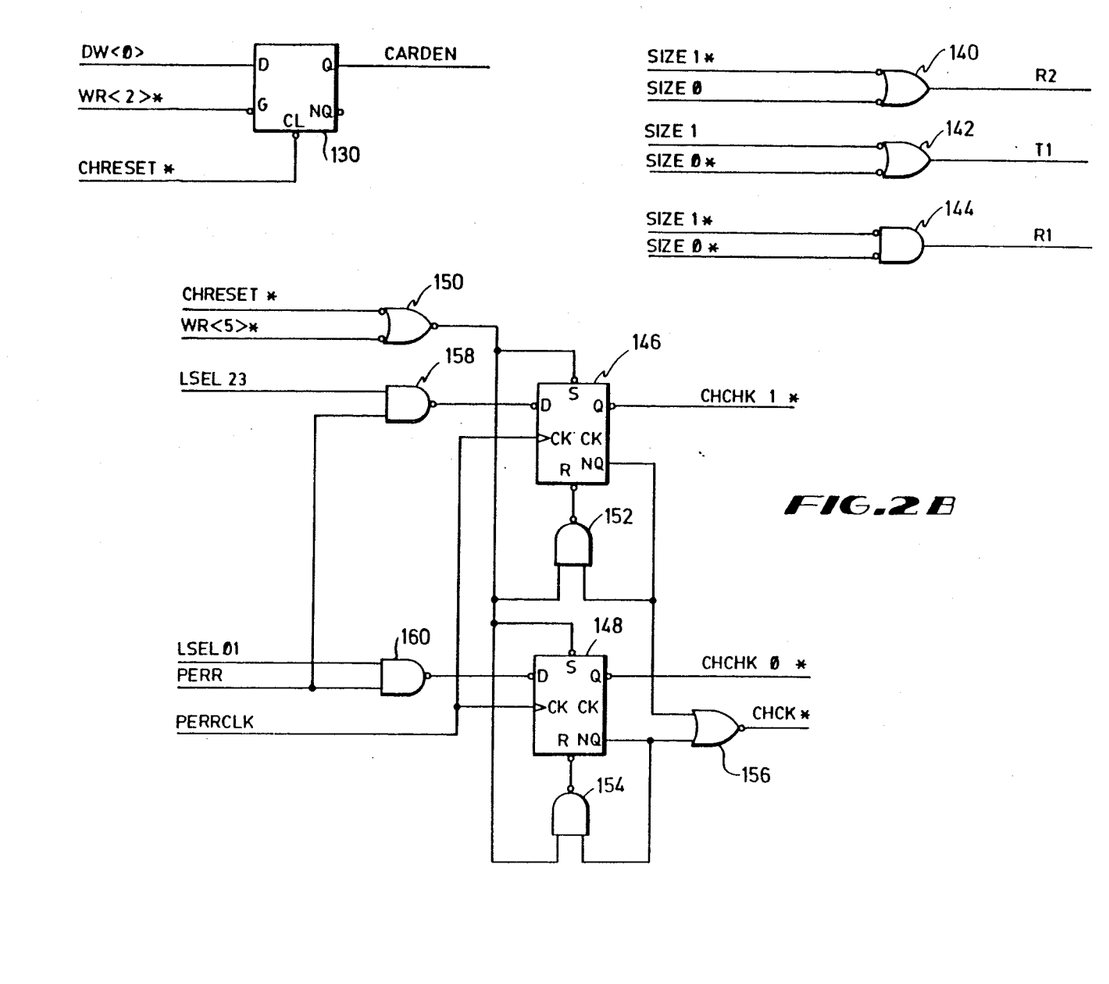
Figure 3:
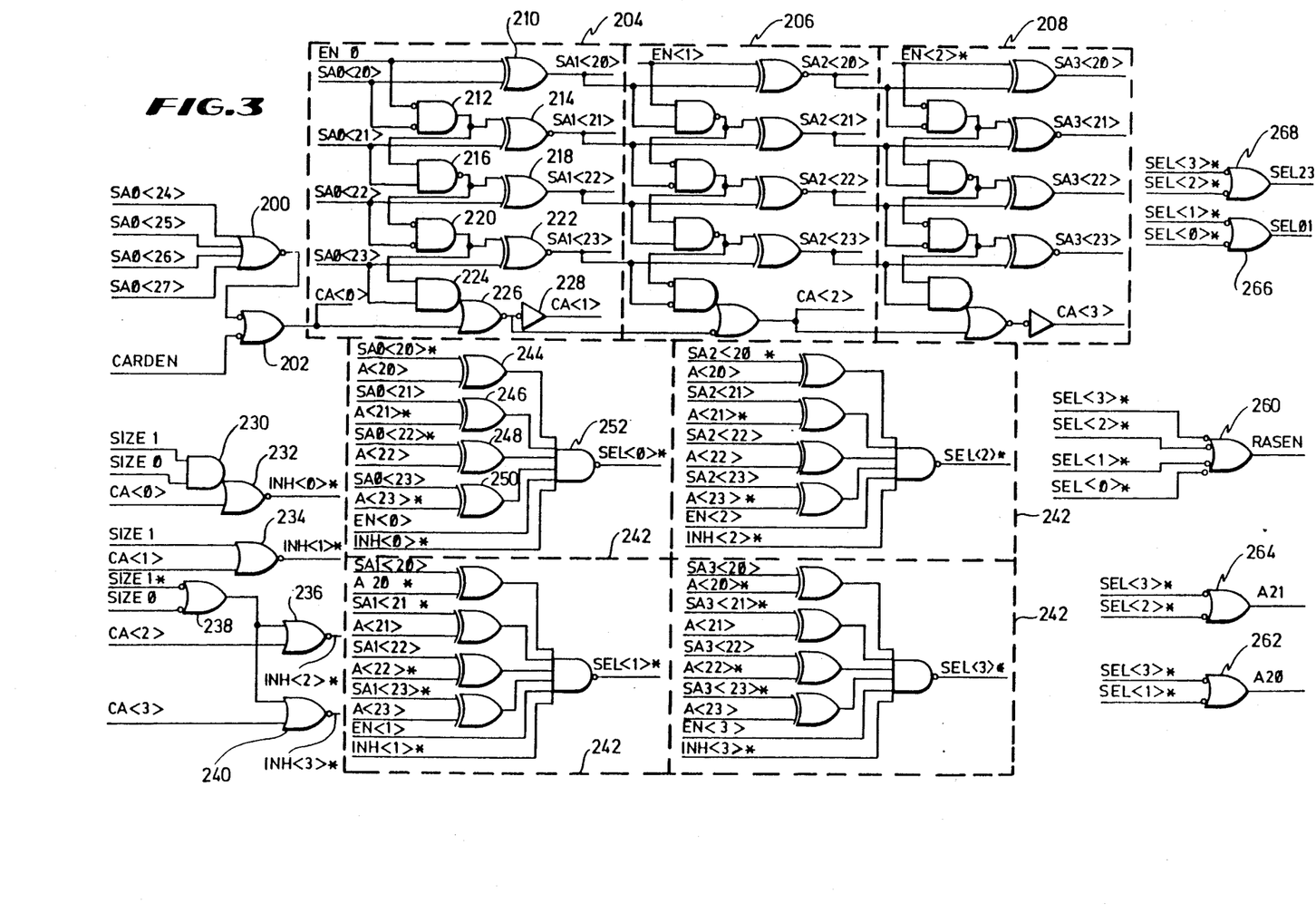

The memory modules 12, 14 and 16 provide output signals to the unifying logic 18, which also receives the REFRESH* signal from the MCA bus. The unifying logic 18 then produces the row address strobe or RAS control enable signals to be used with the particular memory arrays used in the preferred embodiment. The unifying logic 18 also produces the CHCK* signal, the CDDS16* signal and the CDSFDBK* signal utilized to indicate, respectively, channel check or parity errors to the MCA bus, the presence of a 16 bit operating device to the MCA bus and indicating that the adaptor or circuit board is being addressed and is responding. The memory modules 12, 14 and 16 are all similar in construction and thus only one representative sample is shown in FIGS. 2 and 3.

Each memory module 12, 14 or 16 incorporates the appropriate POS registers utilized on the memory boards being emulated. The address and control decode logic 10 provides certain common signals such as the IOCMD100* signal, which indicates that an I/O command in the address range 100 to 107 is present and the POS<6-0>* signals which are based on the lower 3 bits of the address bus to indicate which of the seven POS registers is actually being addressed. Additionally, latched versions of the S0 and S1 status signals decoded to indicate write and read operations are provided as LS<0> and LS<1>, respectively.

The IOCMD100* signal is provided to one input of a two input NOR gate 110, with the second input to the NOR gate 110 being the SETUP* signal appropriate to the given memory module 12, 14 or 16. The output of the NOR gate 110 is provided to one input of two two input NAND gates 112 and 114. The LS<1> signal is connected to the second input of the NAND gate 112. Therefore, the output of the NAND gate 112 indicates that a setup mode POS read operation is being requested. The LS<0> signal is connected to the second input of the NAND gate 114, the output of the NAND gate 114 thereby indicating that a setup mode POS write operation is being requested. The output of the NAND gate 112 is presented to one input of each of a series of seven OR gates 116. The second input to each of the OR gates 116 is connected to, respectively, the seven signals represented by the POS<6-0>* signals. The outputs of the OR gates 116 then correspond to the RD<6-0>* signals, which indicate that a read operation is being requested at the given POS register. The seven RD<6-0>* signals are connected to individual inputs of a NAND gate 118, whose output is the DENA signal, which indicates that the module is being enabled. The output of the NAND gate 114 is connected to one input on each of three OR gates 120, each of whose other input is connected to the POS<2>*, POS<3>* and POS<5>* signals. The outputs of the three OR gates 120 then represent the WR<2>*, WR<3>* and WR<5>* signals which, respectively, indicate that write operations are being requested on the particular POS register. Thus, this combination of gates provides the final address and direction decoding for the particular POS registers which are located in each memory module 12, 14 and 16.

The data bus is split internally in each memory module to a write data bus and a read data bus, referred to by the DW signals and the DR signals. Two latches 122 and 124 have their inputs connected to the DW<7-0> signals, with the two low true enable inputs being connected to the WR<3>* signal and the clear inputs being connected to the CHRESET* signal. Thus, the data is latched in on the rising edge of the WR<3>* signal, the rising edge occurring when the data presented on the MCA bus is valid and has properly reached the latches 122 and 124. The information stored in the latches 122 and 124 is the 8 bits of the starting address in the 27 to 20 bit positions of the particular memory location assigned to that module. These signals are indicated by the SA<27-20> signals.

The DW<5-0> signals are connected to the D inputs of two latches 126 and 128. These latches have their low true enable inputs connected to the WR<5>* signal and their clear inputs connected to the CHRESET* signal. These latches thus perform the storage function for POS register 105 of each module, the outputs being indicated as the various memory block enable signals. When used with the actual enabling of memory in the module, the signals are referred to as EN<3-0>, only four signals being needed in the preferred embodiment, while when being fed back to the system by means of reading the POS register 105 they are referred to as the E<5-0> signals. In the preferred embodiment, each of three memory modules may contain up to 4 Mbytes of memory, in contrast to the 6 Mbytes which can be provided on the circuit boards made by IBM which are being emulated. Therefore, only the lower 4 enable signals are actually utilized for operation. Another latch 130 has at its D input the DW<0> signal, at its low true enable input the WR<2>* signal and at its clear input the CHRESET* signal. The output of this latch 130 is referred to as the CARDEN signal, used to indicate whether the particular memory module or the card it is emulating is enabled.

Feedback of the various values which are contained in the POS registers is obtained by using a series of NOR-OR gates 132, 134, 136 and 138. NOR-OR gate 132 is used to provide the 0 bit of the data read signal, that is DR<0>*. There are six NOR gates used in the initial stage of the NOR-OR gate 132, all of whose outputs connect to the final OR output stage. Each of the six NOR gates has connected at one input an RD<6-1>* signal. The other input to the NOR gate is the appropriate bit as necessary to emulate the memory card. The NOR-OR gate 134 utilizes four NOR gates connected to the OR gate and has an output forming the DR<1>* signal. Each of the NOR gates has a connection made to the RD<6-3>* signals, with the other inputs to each of the NOR gates being the respective appropriate bit. The NOR-OR gate 136 provides the DR<2>* signal and has four component NOR gates connected to the output OR gate. One input to each of the NOR gates is the RD<5-3,1>* signals, with the appropriate other bits being connected to the other input of the NOR gates. The final NOR-OR gate 138 is a series of five NOR-OR gates providing the DR<7-3>* signals. Each NOR-OR gate 138 has two NOR gates connected to the output OR gate. The input to one of the NOR gates is the RD<3>* signal, with the other input to that NOR gate being the SA<27-23> signals to complete feedback of the memory starting location for the module. The other NOR gate utilized in NOR-OR gate 138 has as its input the RD<5>* to indicate a read for the POS register 105. The enable signals E<5-3> are provided to the NOR gates forming the DR<5-3>* signals, while the CHCK* signal is provided to the other two NOR gates. The CHCK* signal is a signal indicative of a parity error or other high level error in the memory module. Thus the NOR-OR gates 132, 134, 136 and 138 provide the multiplexing function necessary to allow all of the various registers to be provided through the common data bus DR<7-0>*. A value of 0 is provided for the given bit position whenever the POS read signal appropriate to that register is not provided to that bit position's NOR-OR gate.

Three of the bit positions in the POS register 104 are provided as the R and T bits representative of the memory array module size as utilized by IBM Corporation in the emulated memory board. These R and T bits are encoded based on signals provided on the memory array units utilized by IBM and thus need to be emulated by the present invention. The memory array units preferably used in a circuit board according to the present invention utilize the SIZE0 and SIZE1 signals to indicate the memory array unit size. A value of 00 for the SIZE1, SIZE0 signals indicates that a 2 Mbyte memory array unit is installed, while a 01 value indicates that a 4 Mbyte array unit is installed, a 10 value indicates that a 1 Mbyte memory array unit is installed and a 11 value indicates that no array unit is installed. These values are properly translated by NAND gates 140 and 142 and NOR gate 144 to form the R2, T1 and R1 signals necessary for emulation in this instance. A T2 signal is not necessary because that is utilized only in cases where 6 Mbytes are installed on the IBM memory board, a condition not possible based on this emulation design.

The SIZE1* and SIZE0 signals are provided to the inputs to the two input NAND gate 140, whose output is then the R2 signal. The SIZE1 and SIZE0* signals are provided to the inputs of the two input NAND gate 142, whose output is in turn the T1 signal. The SIZE1* and SIZE0* signals are provided to the inputs of the two input NOR gate 144, whose output is the R1 signal. These R2, T1 and R1 signals are properly connected to inputs to the NOR-OR gates 132, 134 and 136 to allow feedback to the system.

Certain other signals which are provided to the NOR-OR gates 132 and 134 are the CHCHK<1-0>* signals, which indicate the portion of the memory the parity error has occurred. These signals are output by the inverting output of two D-type flip-flops 146 and 148, respectively. The set inputs of the flip-flops 146 and 148 are connected to the output of a two input AND gate 150. The inputs to the AND gate 150 are the CHRESET* signal and WR<5>* signal. Therefore, the flip-flops 146 and 148 are set whenever the circuit board is reset or a write operation occurs to the POS register 105. The reset input to the CHCHK<1> flip-flop 146 is provided by the output of a NAND gate 152. The inputs to the NAND gate 152 are the set signal as provided by the output of the AND gate 150 and the non-inverting output of the CHCHK<1> flip-flop 146, which represents the CHK<1> signal. The reset signal to the CHCHK<0> flip-flop 148 is similarly provided by a NAND gate 154, whose inputs are connected to the non-inverting output of the CHCHK<0> flip-flop 148 and to the output of the AND gate 150. The non-inverting outputs of the flip-flops 146 and 148 are also connected to the two inputs of a two input NOR gate 156, whose output is the CHCK* signal, the general channel check or parity error signal for the module. The inverted inputs to the flip-flops 146 and 148 are connected to the outputs of two input NAND gates 158 and 160, respectively. One input to each NAND gate 158 and 160 is the PERR signal, which indicates that a parity error has occurred in the memory associated with the particular module. The NAND gate 158 has as its second input the LSEL23 signal, a latched version of a signal which indicates that the higher 2 Mbytes of the available memory location of the module have been addressed. The second input to the NAND gate 160 is provided by the LSEL01 signal, which indicates that the lower 2 Mbytes of the memory module have been addressed. The clocking signal to the flip-flops 146 and 148 is provided by the PERRCLK signal, which provides a positive edge at the appropriate time that the parity error signal is valid in relation to the memory timing cycles. Thus this combination of circuits provides a determination as to which half of the memory the parity error occurred in and allows indication to the system unit that a parity error has occurred in the memory module.

As indicated, the starting address for the memory associated with a memory module 12, 14 and 16 is contained in the latches 122 and 124 which provide the upper 8 address bits of the appropriate address. These address signals are used in combination with various sets of logic including of a series of adders and comparators to determine if a given 1 Mbyte block of memory is being addressed. The preferred embodiment of a memory board incorporating the present invention is designed to only operate in the lower 16 Mbytes of the memory space. Thus, if the upper four address lines 27 to 24 representing the starting address of the module are anything other than zero the module is disabled. This is done by having the SA0<27-24> signals inputs of a four input NOR gate 200 (FIG. 3). The output of the NOR gate 200 is provided to one input of a two input NAND gate 202 whose other input is provided by the CARDEN signal. Thus if the card is disabled by the presence of a low value on the CARDEN signal or if a low value appears because one of the SA<27-24> signals is high, the output of the NAND gate 202 is high, indicating that the module should not respond to an operation.

The output of the NAND gate 202 is referred to as the CA<0> signal, that is, the carry signal to the first of a series of adders 204. Three adders 204, 206 and 208 are utilized in conjunction with the EN<2-0> signals, the CA<0> signal and further carry signals to determine the appropriate starting locations of each 1 Mbyte memory block which can be contained in the module. The starting address of the first 1 Mbyte memory block is presumed to be the starting address as contained in the latches 122 and 124. To this value, the EN<0>* signal is added by adder 204. Thus, as shown in adder 204, the EN<0>* signal is combined with the SA<20>* signal by an XOR gate 210 to develop the SA1<20> signal. The SA0 signals refer to the starting address value of the first memory block, while the SA1 signals refer to the starting address signals of the second memory block and so on. The EN<0>* signal and the SA0<20>* signal are the inputs to a two input NOR gate 212. The output of the NOR gate 212 is provided as one input to an EQUAL gate 214, whose other input is the SA0<21> signal. The output of the EQUAL gate 214 is the SA1<21>* signal. The output of NOR gate 212 is also provided as one input of a two input NAND gate 216 whose other input is the SA0<21> signal. The output of the NAND gate 216 is provided as one input to an XOR gate 218 whose other input is the SA0<22>* signal. The output of the XOR gate 218 is the SA1<22> signal. The output of the NAND gate 216 is provided as one input to a two input NOR gate 220 whose other input is the SA0<22>* signal. The output of the NOR gate 220 is provided to an EQUAL gate 222, whose second input is the SA0<23> signal. The output of the EQUAL gate 222 is the SA1<23>* signal. The output of NOR gate 220 is also provided to the one input of a two input AND gate 224, whose other input is the SA0<23> signal. The output of the AND gate 224 is provided as one input to a two input NOR gate 226, whose other input is the CA<0> signal. The output of the NOR gate 226 is the CA<1>* signal, whose output is inverted by inverter 228 to form the CA<1> signal, the carry signal from the first adder 204. Thus the adder 204 effectively adds the EN<0> value to the starting address value to determine the starting address of the next memory block, with the lower carry signal passing through and being set if the addition produces a carry in the 16 Mbyte area.

Adder 206 is of similar construction except that the various input signals are inverses and the various output signals are inverses with the appropriate changes made to the gates. Adder 208 is identical to adder 204 except that the inputs are the SA2 and CA<2> signals and the outputs are the SA3 signals and the CA<3> signal. This construction of adders results such that if any of the carry signals are true, this is an indication that the starting address of that block and all following blocks is in excess of the lower 16 Mbytes at which the board is preferably located.

While the preferred embodiment utilizes both inverted and noninverted signals to perform the addition to reduce the number of circuit components needed to implement the function as an integrated unit, conventional noninverted circuitry could be used if desired.

Inhibit signals are developed based on the size of the memory array units actually plugged into the module. This development utilizes the SIZE0 and SIZE1 signals. The SIZE1 and SIZE0 signals are the two inputs to an AND gate 230 whose output is connected to one input of a NOR gate 232. The other input to the NOR gate 232 is the CA<0> signal. The output of the NOR gate 232 is the INH<0>* signal, which indicates that the first block of memory is to be inhibited when low, either because the carry signal is present or no memory array unit is present. An INH<1>* signal is developed at the output of a two input NOR gate 234, whose inputs are the CA<1> signal and the SIZE1 signal. Thus the second memory block is inhibited if there has been a carry into this block or a 2 Mbyte memory array unit or larger is not installed. An INH<2>* signal is developed at the output of a two input NOR gate 236. One input to the NOR gate 236 is the CA<2> signal, while the other input is the output of a two input NAND gate 238. The NAND gate 238 has inputs of the SIZE1* and SIZE0 signals so that the signal is high if the 4 Mbyte memory module has not been installed. The output signal from the NAND gate 238 is also supplied as one input to a two input OR gate 240, the other input being the CA<3> signal. Therefore, the output of the NOR gate 240 is the INH<3>* signal, relating to the operation of the fourth and final memory block.

The memory addresses as developed on the system address bus, the starting memory addresses for each module, the enable signal for a given memory block and the inhibit signal for that particular block are compared in four identical comparators generally referred to by the number 242. Each comparator consists of four XOR gates 244, 246, 248 and 250. Each of the XOR gates 244, 246, 248 and 250 has connected at one input the starting address bits <23-20> or their inverse for that particular memory block. Connected to the other input of the XOR gates 244, 246, 248 and 250 are the inverses of the address lines presented on the MCA bus for that particular operation or the true values. The inputs to the XOR gates 244, 246, 248 and 250 are such that if an inverse value is presented on one of the lines at one input, the true value is presented at the other input to the XOR gate. For example, if the SA0<20>* signal is one input, the A<20> signal is the other input. Thus the XOR gates 244, 246, 248 and 250 are determining whether the presented address is equal to the block start address. The four outputs of the XOR gates 244, 246, 248 and 250 are four inputs to a six input NAND gate 252. The other two inputs to the NAND gate 252 are the EN<0> signal and the INH<0>* signal in the case of the comparator dealing with the first memory block. Thus if the memory block is not enabled or is inhibited, the output of the NAND gate 252 is high, indicating that particular block of memory is not selected.

The output of the NAND gate 252 is the SEL<0>* signal or other signal as appropriate based on the particular block to which the comparator 242 is associated. The SEL* only goes low whenever the particular block is enabled, it has not been inhibited, and the address presented on the address bus is equal to the starting address of that particular block as determined by the appropriate adder.

It can be seen that this is a simple and straightforward method for being able to disable a given 1 Mbyte block of memory and yet having all of the other addresses above that block be correctly determined. Complicated combinational functions which take into account each and every possibility and provide a full term solution are not necessary. Expansion of this concept can be easily done by simply adding an adder, a comparator blocks and the various necessary inhibit determining gates for each memory block being added. There is no geometric progression of terms as the number of blocks to be individually enabled is increased but merely a simple linear progression based on the number of blocks being utilized.

The outputs from the four respective comparators 242 are provided to the inputs to a four input NAND gate 260. The output of the NAND gate 260 is the RASEN signal, which indicates that it is appropriate to enable the RAS lines for the memory associated with the particular memory module. Additionally, the SEL<1>* and SEL<3>* signals are provided as the inputs to a two input NAND gate 262, whose output is the A20 signal. The SEL<2>* and SEL<3>* signals are provided as the inputs to a two input NAND gate 264 whose output is the A21 signal. These encoded A20 and A21 signals are then utilized with the memory module to enable proper encoding without requiring the use of translations based on the address bus information. Further, the SEL<1>* and SEL<0>* signals are provided as the two inputs to a NAND gate 266 whose output is the SEL01 signals, which indicates that an address located in the lower 2 Mbytes has been recognized by the module. The SEL<3>* and SEL<2>* signals are provided as the two inputs to a two input NAND gate 268, whose output therefore is the SEL23 signal to indicate a successful match on the upper 2 Mbyte block. These signals are appropriately latched for utilization in the channel check circuitry as previously discussed.

Figure 4:
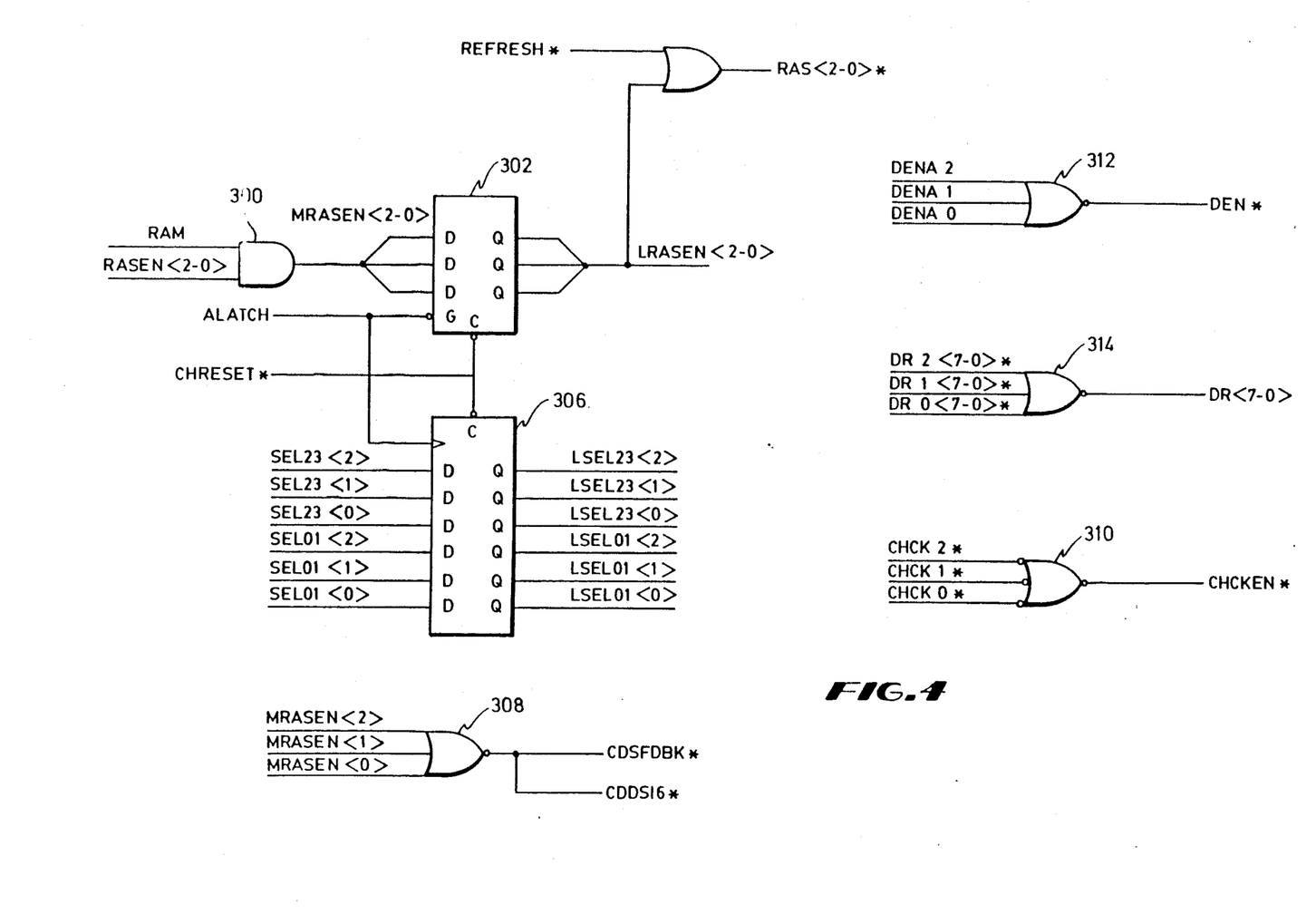

As mentioned, this block address determination circuitry is repeated in each memory module 12, 14 and 16 for each memory board being emulated. Outputs are provided from the memory modules 12, 14 and 16 to the unifying logic 18. Some of this circuitry is shown in FIG. 4. In FIG. 4, the number within the < > when appropriate, is used to indicate the particular memory module from which the signals are being provided. Therefore, for example, each AND gate 300 (FIG. 4) in a series of three AND gates has one input connected to the RAM signal which indicates that RAM is being accessed in the system, and each has an input connected to one of the RASEN<2-0> signals. These three AND gates 300 then indicate that the RAM is being accessed and it is associated with the particular module. The signals, which are the MRASEN<2-0> signals, are then latched by a latch 302. The low true latch enable input is connected to the ALATCH signal, which has appropriate timing to hold the LRASEN<2-0> signals valid to the end of the pipeline cycle. The clear input to the latch 302 is connected to the CHRESET* signal. The outputs from the latch 302 are the LRASEN<2-0> signals indicating latched RAS enables for the particular memory modules. These three signals are then combined in three OR gates 304 with the REFRESH* signal. This is necessary because all RAS signals must be enabled whenever a refresh operation is occurring to allow optimal refreshing of the memory. The outputs of the OR gates 304 are the RAS<2-0>* signals, which are then used in combination with more lower level memory address signals by the particular drive circuitry associated with the actual memory devices located on the circuit board.

A flip-flop 306 is provided whose clocking signal is provided by the ALATCH signal and whose D inputs are connected to the respective SEL01 and SEL23 signals of each module 12, 14 and 16 so that the LSEL01 and LSEL23 signals result. These signals are respectively utilized in the channel check circuitry as previously discussed.

The MRASEN<2-0> signals are also supplied as the three inputs to a single three input NOR gate 308. The output of the NOR gate 308 is the CDSFDBK* signal and the CDDS16* signal. The CDSFDBK* signal is used in particular on the MCA bus to indicate that this particular card is responding to the operation being requested. The CDDS16* signal is utilized to indicate that a 16 bit device is responding. In this case both are provided by the output of the NOR gate 308 because the preferred embodiment of the circuit board utilized a 16 bit output and there are three devices being emulated. If, for instance, system memory were to be placed on the same circuit board, the CDDS16* signal would be triggered anytime any of the memory was accessed to indicate that a 16 bit device was responding because this would be utilized by the bus controller to properly channel data information. However, the CDSFDBK* signal would not respond to system memory area accesses because it would not be appropriate for system board memory to respond as if it were present in a slot because system board memory in an IBM machine is assumed not to be located on the bus and therefore not on an adaptor card. If an adaptor card were to respond to a system board address, this could be considered a possible error in certain cases and certain items might not perform correctly. Therefore, for full emulation capabilities the CDSFDBK* signal would not be lowered if system board memory were also located on a circuit board incorporating the present invention.

The three channel check signals developed by the three modules 12, 14 and 16 are indicated as the CHCK0* the CHCK1* and the CHCK2* signals and are provided as the three inputs to a single three input AND gate 310 whose output is then the CHCKEN* signal which is provided to the MCA bus to indicate a parity error has occurred on this particular memory board. The DENA signals as developed by the seven input NAND gates 118 are referred to the DENA0, DENA1 and DENA2 signals for the appropriate modules and are the three inputs to a single three input NOR gate 312. The output of the NOR gate 312 is the DEN* signal which goes low whenever the circuit board is enabled.

It is also necessary to combine the various DR<7-0>* signals as developed by each module. This is done by a series of three input NOR gates 314 who have as their inputs the DR0<7-0>*, DR1<7-0>* and DR2<7-0>* signals. The outputs of the NOR gates 314 are then the DR<7-0> signals which can then be appropriately connected to the lower 8 bits of the MCA data bus through a buffer or transceiver.

The foregoing disclosure and description of the invention are illustrative and explanatory thereof, and various changes in the size, shape, materials, components, circuit elements, wiring connections and contacts, as well as in the details of the illustrated circuitry, construction and operation may be made without departing from the spirit of the invention.

What is claimed:

1. A circuit for determining if a second block of memory contained on a circuit board having capacity for at least two memory blocks is being addressed, the circuit board receiving the memory addresses associated with a memory request, comprising:
    means for storing values representing the starting address of the first memory block;
    means for storing values representing the enabled states of the first and second blocks of memory;
    an adder for adding values representing the starting address of the first block of memory and a value representing the enabled state of the first block of memory to determine values representing the starting address of the second block of memory;
    a comparator for comparing values representing the starting address of the second block of memory as determined by said adder with the requested memory address to determine if the requested memory address is addressing the second block of memory;
    means for determining if the second memory block is present on the circuit board; and
    wherein said comparator disables the comparison if the second memory block is not present.

2. A circuit for determining if a second block of memory contained on a circuit board having at least two memory blocks is being addressed, the circuit board receiving the memory addresses associated with a memory request, comprising:
    means for storing values representing the starting address of the first memory block;
    means for storing values representing the enabled states of the first and second blocks of memory;
    an adder for adding values representing the starting address of the first block of memory and a value representing the enabled state of the first block of memory to determine values representing the starting address of the second block of memory; and
    a comparator for comparing values representing the starting address of the second block of memory as determined by said adder with the requested memory address to determine if the requested memory address is addressing the second block of memory,
    wherein said adder develops a carry signal which is true if the addition produces a carry; and
    said comparator disables comparison if the carry signal is true.

3. A circuit for determining if a second block of memory contained on a circuit board having capacity for at least two memory blocks is being addressed, the circuit board receiving the memory addresses associated with a memory request, comprising:
- means for storing values representing the starting address of the first memory block;
- means for storing values representing the enabled states of the first and second blocks of memory;
- an adder for adding values representing the starting address of the first block of memory and a value representing the enabled state of the first block of memory to determine values representing the starting address of the second block of memory;
- a comparator for comparing values representing the starting address of the second block of memory as determined by said adder with the requested memory address to determine if the requested memory address is addressing the second block of memory;
- means for determining if the second memory block is present on the circuit board;
- wherein said adder develops a carry signal which is true if the addition produces a carry; and
- wherein said comparator disables the comparison if the second memory block is disabled, if the second memory is not present on the circuit board, or if the carry signal is true.

4. A circuit for determining if a second block of memory contained on a circuit board having capacity for at least two memory blocks is being addressed, the circuit board receiving the memory addresses associated with a memory request, comprising:
- means for storing values representing the starting address of the first memory block;
- means for storing values representing the enabled states of the first and second blocks of memory;
- an adder for adding values representing the starting address of the first block of memory and a value representing the enabled state of the first block of memory to determine values representing the starting address of the second block of memory;
- a comparator for comparing values representing the starting address of the second block of memory as determined by said adder with the requested memory address to determine if the requested memory address is addressing the second block of memory;
- means for inhibiting the operation of said comparator, said inhibiting means including means for determining if the second memory block is present on the circuit board;
- means for determining if a carry out has been produced by said adder; and
- means for producing an inhibit signal if the second memory block is not present or if a carry out has been produced; and
- wherein said comparator is inhibited if an inhibit signal is received from said inhibiting means.

5. A circuit for determining if an n+1 block of memory contained on a circuit board having capacity for a plurality of memory blocks is being addressed, the circuit board receiving the memory addresses associated with a memory request, comprising:
- means for storing values representing the starting addressing of the n block of memory;
- means for storing the values representing the enabled states of the n and n+1 blocks of memory;
- an adder for adding values representing the starting address of the n block of memory and a value representing the enabled state of the n block of memory to determine values representing the starting addressing the n+1 block of memory;
- a comparator for comparing values representing the starting address of the n+1 block of memory as determined by said adder with the requested memory address to determine if the requested memory address is addressing the n+1 block of memory and producing a signal indicative thereof;
- means for determining if the n+1 memory block is present on the circuit board; and
- wherein said comparator disables the comparison if the n+1 memory block is not present.

6. A circuit for determining if an n+1 block of memory contained on a circuit board having a plurality of memory blocks is being addressed, the circuit board receiving the memory addresses associated with a memory request, comprising:
- means for storing values representing the starting addressing of the n block of memory;
- means for storing the values representing the enabled states of the n and n+1 blocks of memory;
- an adder for adding values representing the starting address of the n block of memory and a value representing the enabled state of the n block of memory to determine values representing the starting addressing of the n+1 block of memory; and
- a comparator for comparing values representing the starting address of the n+1 block of memory as determined by said adder with the requested memory address to determine if the requested memory address is addressing the n+1 block of memory and producing a signal indicative thereof;
- wherein said adder develops a carry signal which is true if the addition produces a carry; and
- said comparator disables comparison if the carry signal is true.

7. A circuit for determining if an n+1 block of memory contained on a circuit board having capacity for a plurality of memory blocks is being addressed, the circuit board receiving the memory addresses associated with a memory request, comprising:
- means for storing values representing the starting addressing of the n block of memory;
- means for storing the values representing the enabled states of the n and n+1 blocks of memory;
- an adder for adding values representing the starting address of the n block of memory and a value representing the enabled state of the n block of memory to determine values representing the starting addressing the n+1 block of memory;
- a comparator for comparing values representing the starting address of the n+1 block of memory as determined by said adder with the requested memory address to determine if the requested memory address is addressing the n+1 block of memory and producing a signal indicative thereof;
- means for determining if the n+1 memory block is present on the circuit board;
- wherein said adder develops a carry signal which is true if the addition produces a carry; and
- wherein said comparator disables the comparison if the n+1 memory block is disabled, if the n+1 memory is not present on the circuit board, or if the carry signal is true.

8. A circuit for determining if an n+1 block of memory contained on a circuit board having capacity for a plurality of memory blocks is being addressed, the circuit board receiving the memory addresses associated with a memory request, comprising:

means for storing values representing the starting addressing of the n block of memory;

means for storing the values representing the enabled states of the n and n+1 blocks of memory;

an adder for adding values representing the starting address of the n block of memory and a value representing the enabled state of the n block of memory to determine values representing the starting addressing of the n+1 block of memory;

a comparator for comparing values representing the starting address of the n+1 block of memory as determined by said adder with the requested memory address to determine if the requested memory address is addressing the n+1 block of memory and producing a signal indicative thereof;

means for inhibiting the operation of said comparator, said inhibiting means including means for determining if the n+1 memory block is present on the circuit board;

means for determining if a carry out has been produced by said adder;

means for producing an inhibit signal if the n+1 memory block is not present or if a carry out has been produced; and wherein said comparator is inhibited if an inhibit signal is received from said inhibiting means.

* * * * *